United States Patent
Huang et al.

(10) Patent No.: US 9,602,461 B2
(45) Date of Patent: Mar. 21, 2017

(54) SERVICE FORWARDING METHOD AND DEVICE

(71) Applicant: Huawei Technologies Co., Ltd., Shenzhen (CN)

(72) Inventors: Kangyong Huang, Chengdu (CN); Xing Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 14/538,408

(22) Filed: Nov. 11, 2014

(65) Prior Publication Data

US 2015/0063170 A1 Mar. 5, 2015

Related U.S. Application Data

(63) Continuation of application No. PCT/CN2013/074115, filed on Apr. 12, 2013.

(30) Foreign Application Priority Data

Nov. 27, 2012 (CN) .......................... 2012 1 0489165

(51) Int. Cl.
  *H04L 29/12* (2006.01)
  *H04L 12/46* (2006.01)
  *H04W 40/02* (2009.01)

(52) U.S. Cl.
  CPC ........ *H04L 61/103* (2013.01); *H04L 12/4633* (2013.01); *H04L 61/6022* (2013.01); *H04W 40/02* (2013.01); *Y02B 60/43* (2013.01)

(58) Field of Classification Search
  CPC ........ H04L 47/14; H04W 28/06; H04W 28/10
  See application file for complete search history.

(56) References Cited

U.S. PATENT DOCUMENTS 8,848,635 B2 * 9/2014 Arvidsson ..................... 370/252
9,426,690 B2 * 8/2016 Damola ............ H04W 28/0273
(Continued)

FOREIGN PATENT DOCUMENTS

CN 101110746 A 1/2008
CN 102238091 A 11/2011
(Continued)

OTHER PUBLICATIONS

Kramer, G., et al., "The IEEE 1904.1 Standard: SIEPON Architecture and Model," IEEE Communications Magazine, vol. 50, No. 9, Sep. 2012, pp. 98-108.
(Continued)

*Primary Examiner* — Chandrahas Patel
(74) *Attorney, Agent, or Firm* — Slater Matsil, LLP (57) ABSTRACT

Embodiments of the present invention provide a service forwarding method and device. The method includes receiving an uplink packet of a base station that is sent by a user-end provider edge (UPE) device over a transport tunnel. The uplink packet carries an Internet Protocol (IP) address of the base station and an identifier of the transport tunnel. The method further includes establishing a mapping relationship between the IP address of the base station and the identifier of the transport tunnel according to the uplink packet, and sending a downlink service packet to the UPE device over the transport tunnel according to the mapping relationship. A destination IP address of the downlink service packet is the IP address of the base station.

18 Claims, 6 Drawing Sheets

(56) References Cited

U.S. PATENT DOCUMENTS

2006/0114915 A1    6/2006   Kalkunte et al.
2008/0240100 A1   10/2008   Smith et al.

FOREIGN PATENT DOCUMENTS

| CN | 103024852 A | 4/2013 |
|---|---|---|
| EP | 2362587 A1 | 8/2011 |
| EP | 2648369 A1 | 10/2013 |
| WO | 2004038559 A2 | 5/2004 |
| WO | 2012094912 A1 | 7/2012 |

OTHER PUBLICATIONS

Plummer, D. C., "An Ethernet Address Resolution Protocol or Converting Network Protocol Addresses to 48.bit Ethernet Address for Transmission on Ethernet Hardware," Network Working Group, Nov. 1982, 10 pages.

* cited by examiner

SERVICE FORWARDING METHOD AND DEVICE

This application is a continuation of International Application No. PCT/CN2013/074115, filed on Apr. 12, 2013, which claims priority to Chinese Patent Application No. 201210489165.0, filed on Nov. 27, 2012, both of which are hereby incorporated by reference in their entireties.

TECHNICAL FIELD

The present invention relates to the communications field, and in particular, to a service forwarding method and device.

BACKGROUND

Built based on a switched local area network, a virtual local area network (VLAN) is an end-to-end logical network that may span different network segments and different networks. Due to its advantages in performance, such as a high flexibility, the VLAN is widely used. On a transport network in the prior art, a packet service is forwarded based on the VLAN. For example, both an Ethernet line (E-line) service and an Ethernet local area network (E-LAN) service rely on the VLAN to implement distribution and forwarding.

On a transport network, to implement service distribution and forwarding based on a VLAN, a transport VLAN and a wireless VLAN on a base station side need to be jointly planned; therefore, there is a strong coupling between the transport VLAN and the wireless VLAN, and coordinated configuration is required between different devices, thereby causing a heavy coordination workload and complicated network adjustment.

SUMMARY

Embodiments of the present invention provide a service forwarding method and device, which can reduce a workload of coordination between different devices.

According to a first aspect, a service forwarding method is provided. The method includes receiving an uplink packet of a base station that is sent by a user-end provider edge (UPE) device over a transport tunnel. The uplink packet carries an Internet Protocol (IP) address of the base station and an identifier of the transport tunnel. The method further includes establishing a mapping relationship between the IP address of the base station and the identifier of the transport tunnel according to the uplink packet, and sending a downlink service packet to the UPE device over the transport tunnel according to the mapping relationship. A destination IP address of the downlink service packet is the IP address of the base station.

With reference to the first aspect, in a first possible implementation manner, the receiving an uplink packet of a base station that is sent by a UPE device over a transport tunnel. The uplink packet carries an IP address of the base station and an identifier of the transport tunnel includes receiving an uplink Address Resolution Protocol ARP packet of the base station that is sent by the UPE device over the transport tunnel. The uplink ARP packet carries an interface IP address of the base station and the identifier of the transport tunnel.

The establishing a mapping relationship between the IP address of the base station and the identifier of the transport tunnel according to the uplink packet includes establishing a mapping relationship between the interface IP address of the base station and the identifier of the transport tunnel according to the uplink ARP packet.

With reference to the first aspect, in a second possible implementation manner, the receiving an uplink packet of a base station that is sent by a UPE device over a transport tunnel. The uplink packet carries an IP address of the base station and an identifier of the transport tunnel includes receiving an uplink Link Layer Discovery Protocol (LLDP) packet of the base station that is sent by the UPE device over the transport tunnel. The uplink LLDP packet carries the interface IP address of the base station, a service logic IP address of the base station, and the identifier of the transport tunnel.

The establishing a mapping relationship between the IP address of the base station and the identifier of the transport tunnel according to the uplink packet includes establishing a mapping relationship among the interface IP address of the base station, the service logic IP address of the base station, and the identifier of the transport tunnel according to the uplink LLDP packet.

With reference to the first aspect, or the first possible implementation manner of the first aspect, or the second possible implementation manner of the first aspect, in a third possible implementation manner, the method further includes establishing the transport tunnel between a superstratum provider edge SPE device and the UPE device. The transport tunnel is corresponding to a port that is on the UPE device and used for communication with the base station.

With reference to the first aspect, or the first possible implementation manner of the first aspect, or the second possible implementation manner of the first aspect, or the third possible implementation manner of the first aspect, in a fourth possible implementation manner, the identifier of the transport tunnel includes a packet label or a physical pipe identifier.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the method further includes receiving an uplink service packet of the base station that is sent by the UPE device over the transport tunnel, and sending the uplink service packet to a base station gateway through an aggregation port corresponding to the transport tunnel.

According to a second aspect, a service forwarding method is provided, including: sending an uplink packet of a base station to a superstratum provider edge (SPE) device over a transport tunnel. The uplink packet carries an Internet Protocol IP address of the base station and an identifier of the transport tunnel. The method further includes receiving a downlink service packet that is sent by the SPE device over the transport tunnel according to a mapping relationship between the IP address of the base station and the identifier of the transport tunnel. A destination IP address of the downlink service packet is the IP address of the base station. The downlink service packet is sent to the base station.

With reference to the second aspect, in a first possible implementation manner, an uplink packet of a base station is sent to an SPE device over a transport tunnel. The uplink packet carries an IP address of the base station and an identifier of the transport tunnel includes sending an uplink Address Resolution Protocol (ARP) packet of the base station to the SPE device over the transport tunnel. The uplink ARP packet carries an interface IP address of the base station and the identifier of the transport tunnel.

With reference to the second aspect, in a second possible implementation manner, an uplink packet of a base station is sent to an SPE device over a transport tunnel. The uplink packet carries an IP address of the base station and an identifier of the transport tunnel includes sending an uplink Link Layer Discovery Protocol (LLDP) packet of the base station to the SPE device over the transport tunnel. The uplink LLDP packet carries an interface IP address of the base station, a service logic IP address of the base station, and the identifier of the transport tunnel.

With reference to the second aspect, or the first possible implementation manner of the second aspect, or the second possible implementation manner of the second aspect, in a third possible implementation manner, the method further includes establishing the transport tunnel between a user-end provider edge UPE device and the SPE device. The transport tunnel corresponds to a port that is on the UPE device and used for communication with the base station.

With reference to the second aspect, or the first possible implementation manner of the second aspect, or the second possible implementation manner of the second aspect, or the third possible implementation manner of the second aspect, in a fourth possible implementation manner, the identifier of the transport tunnel includes a packet label or a physical pipe identifier.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the method further includes receiving an uplink service packet from the base station, and sending the uplink service packet to the SPE device over the transport tunnel.

According to a third aspect, an SPE device is provided that includes a receiving unit configured to receive an uplink packet of a base station that is sent by a user-end provider edge UPE device over a transport tunnel. The uplink packet carries an Internet Protocol (IP) address of the base station and an identifier of the transport tunnel. A mapping establishing unit is configured to establish a mapping relationship between the IP address of the base station and the identifier of the transport tunnel according to the uplink packet. A sending unit is configured to send a downlink service packet to the UPE device over the transport tunnel according to the mapping relationship. A destination IP address of the downlink service packet is the IP address of the base station.

With reference to the third aspect, in a first possible implementation manner, the receiving unit is specifically configured to receive an uplink Address Resolution Protocol (ARP) packet of the base station that is sent by the UPE device over the transport tunnel. The uplink ARP packet carries an interface IP address of the base station and the identifier of the transport tunnel. The mapping establishing unit is specifically configured to establish a mapping relationship between the interface IP address of the base station and the identifier of the transport tunnel according to the uplink ARP packet.

With reference to the third aspect, in a second possible implementation manner, the receiving unit is specifically configured to receive an uplink Link Layer Discovery Protocol (LLDP) packet of the base station that is sent by the UPE device over the transport tunnel. The uplink LLDP packet carries an interface IP address of the base station, a service logic IP address of the base station, and the identifier of the transport tunnel. The mapping establishing unit is specifically configured to establish a mapping relationship among the interface IP address of the base station, the service logic IP address of the base station, and the identifier of the transport tunnel according to the uplink LLDP packet.

With reference to the third aspect, or the first possible implementation manner of the third aspect, or the second possible implementation manner of the third aspect, in a third possible implementation manner, the device further includes a tunnel establishing unit configured to establish the transport tunnel with the UPE device. The transport tunnel corresponds to a port that is on the UPE device and used for communication with the base station.

With reference to the third aspect, or the first possible implementation manner of the third aspect, or the second possible implementation manner of the third aspect, or the third possible implementation manner of the third aspect, in a fourth possible implementation manner, the identifier of the transport tunnel includes a packet label or a physical pipe identifier.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner, the receiving unit is further configured to receive an uplink service packet of the base station that is sent by the UPE device over the transport tunnel; and the sending unit is further configured to send the uplink service packet to a base station gateway through an aggregation port corresponding to the transport tunnel.

According to a fourth aspect, a UPE device is provided, including: a sending unit, configured to send an uplink packet of a base station to a superstratum provider edge (SPE) device over a transport tunnel, where the uplink packet carries an Internet Protocol (IP) address of the base station and an identifier of the transport tunnel. A receiving unit is configured to receive a downlink service packet that is sent by the SPE device over the transport tunnel according to a mapping relationship between the IP address of the base station and the identifier of the transport tunnel. A destination IP address of the downlink service packet is the IP address of the base station. The sending unit is further configured to send the downlink service packet to the base station.

With reference to the fourth aspect, in a first possible implementation manner, the sending unit is specifically configured to send an uplink Address Resolution Protocol (ARP) packet of the base station to the SPE device over the transport tunnel. The uplink ARP packet carries an interface IP address of the base station and the identifier of the transport tunnel.

With reference to the fourth aspect, in a second possible implementation manner, the sending unit is specifically configured to send an uplink Link Layer Discovery Protocol LLDP packet of the base station to the SPE device over the transport tunnel. The uplink LLDP packet carries an interface IP address of the base station, a service logic IP address of the base station, and the identifier of the transport tunnel.

With reference to the fourth aspect, or the first possible implementation manner of the fourth aspect, or the second possible implementation manner of the fourth aspect, in a third possible implementation manner, the device further includes a tunnel establishing unit, configured to establish the transport tunnel with the SPE device. The transport tunnel is corresponding to a port that is on the UPE device and used for communication with the base station.

With reference to the fourth aspect, or the first possible implementation manner of the fourth aspect, or the second possible implementation manner of the fourth aspect, or the third possible implementation manner of the fourth aspect, in a fourth possible implementation manner, the identifier of the transport tunnel includes a packet label or a physical pipe identifier.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner, the receiving unit is further configured to receive an uplink service packet from the base station and the sending unit is further configured to send the uplink service packet to the SPE device over the transport tunnel.

In the embodiments of the present invention, a mapping relationship is dynamically established between an IP address of the base station and an ID of a transport tunnel according to an uplink packet of a base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA), a Wideband Code Division Multiple Access (WCDMA), a general packet radio service (GPRS), and a Long Term Evolution (LTE).

A base station may be a base station (Base Transceiver Station, BTS) in the GSM or CDMA, may also be a base station (NodeB) in the WCDMA, and may further be an evolved NodeB (eNB, or e-NodeB) in the LTE, which is not limited in the present invention.

Figure 1:
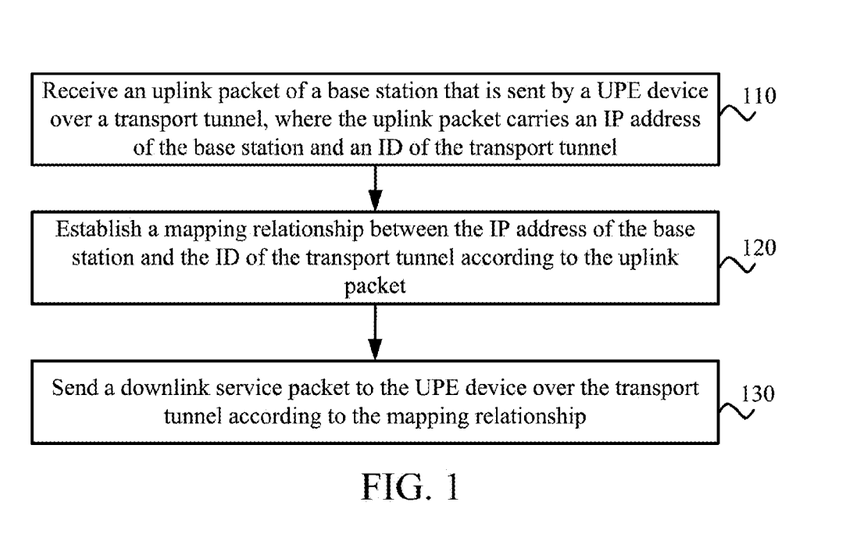
FIG. 1 is a schematic flowchart of a service forwarding method according to an embodiment of the present invention.

FIG. 1 is a schematic flowchart of a service forwarding method according to an embodiment of the present invention. The method in FIG. 1 is executed by a Superstratum Provider Edge (SPE) device.

110. Receive an uplink packet of a base station that is sent by a User-end Provider Edge (UPE) device over a transport tunnel. The uplink packet carries a base station Internet Protocol (IP) address and an ID of the transport tunnel.

Optionally, in an embodiment, before step 110, a transport tunnel may be established between the SPE device and the UPE device, and the transport tunnel is corresponding to a port that is on the UPE device and used for communication with the base station.

The transport tunnel may refer to a tunnel through which the SPE device communicates with the UPE device. There may be one or more ports on the UPE device, and these ports are used for communication with the base station. Each port is corresponding to one base station. One transport tunnel may be established between the SPE device and the UPE device based on each port. In this way, it may be ensured that each base station is corresponding to a separate transport tunnel. Therefore, an Ethernet line (E-Line) connection may still be maintained between the SPE device and the UPE device.

Optionally, in another embodiment, the ID of the transport tunnel may include a packet label or a physical pipe identifier.

For example, the transport tunnel may be identified by an identifier of a VLAN (for example, a Service VLAN (SV-LAN)), a port, a Provider Backbone Bridge (PBB), a Pseudo Wire (PW), an Optical Channel Data Unit (ODU), or the like.

120. Establish a mapping relationship between the IP address of the base station and the ID of the transport tunnel according to the uplink packet.

Optionally, in another embodiment, in step 110, the SPE device may receive an uplink Address Resolution Protocol (ARP) packet of the base station that is sent by the UPE device over the transport tunnel, where the uplink ARP packet carries an interface IP address of the base station. In step 120, the SPE device may establish a mapping relationship between the interface IP address of the base station and the ID of the transport tunnel according to the uplink ARP packet.

Before normal service transmission, an ARP packet is usually transmitted between the base station and a base station gateway, and the base station and the base station gateway may obtain a peer port address from the ARP packet. In addition, during a normal service transmission process, an updated ARP packet may further be periodically transmitted between the base station and the base station gateway. In this embodiment of the present invention, the uplink ARP packet may refer to an ARP packet transmitted in an uplink direction from the base station to the base station gateway. The UPE device receives an original uplink ARP packet from the base station, where the original uplink ARP packet may carry the interface IP address of the base station. The UPE device may encapsulate the ID of the transport tunnel into the original uplink ARP packet to obtain the uplink ARP packet. Therefore, the uplink ARP packet carries the interface IP address of the base station and the ID of the transport tunnel. The SPE device may establish the mapping relationship between the interface IP address of the base station and the ID of the transport tunnel according to the uplink ARP packet. When the uplink ARP packet is updated, the SPE device may further update the foregoing mapping relationship according to an updated uplink ARP packet.

It should be understood that one or more aggregation ports may be planned for the SPE device according to a capacity requirement on a base station side. A group of base stations are corresponding to one aggregation port. Virtual Switching Forwarding (VSF) may be planned for the base station inside the SPE device, and through the VSFs, the transport tunnel may be automatically associated with a corresponding aggregation port. The SPE device may forward the uplink ARP packet to the base station gateway through the aggregation port.

Optionally, in another embodiment, in step 110, the SPE device may receive an uplink Link Layer Discovery Protocol (LLDP) packet of the base station that is sent by the UPE device over the transport tunnel. The uplink LLDP packet may carry an interface IP address of the base station, a service logic IP address of the base station, and the ID of the transport tunnel. The SPE device may establish a mapping relationship among the interface IP address of the base station, the service logic IP address of the base station, and the ID of the transport tunnel according to the uplink LLDP packet.

For example, the base station may add the interface IP address of the base station and the service logic IP address of the base station to a TLV (Type-Length-Value) information string field of the uplink LLDP packet. After receiving the uplink LLDP packet, the UPE device may encapsulate the ID of the transport tunnel into the uplink LLDP packet. Then, after receiving an encapsulated uplink LLDP packet, the SPE device may establish the mapping relationship among the IP address of the base station, the service logic IP address of the base station, and the ID of the transport tunnel.

Because the uplink LLDP packet is a packet transmitted by the base station to the SPE device, in a scenario in which the base station interface IP is re-planned or in a scenario in which the SPE device restarts after power-off and an update cycle of the uplink ARP packet does not arrive, a solution described in this embodiment of the present invention that the mapping relationship is dynamically established between the IP address of the base station and the ID of the transport tunnel according to the uplink LLDP packet is more applicable.

130. Send a downlink service packet to the UPE device over the transport tunnel according to the mapping relationship. A destination IP address of the downlink service packet is the IP address of the base station.

The SPE device may determine a downlink service packet whose destination IP address is the IP address of the base station, determines, according to the mapping relationship, an ID of a transport tunnel corresponding to the IP address, and sends the downlink service packet to the UPE device over the transport tunnel.

Optionally, in another embodiment, the SPE device may further receive an uplink service packet of the base station that is sent by the UPE device over the transport tunnel, and send the uplink service packet to the base station gateway through an aggregation port corresponding to the transport tunnel.

After receiving the uplink service packet, the SPE device may determine a corresponding aggregation port through the VSF, and then send the uplink service packet to the base station gateway through the aggregation port.

It should be understood that the foregoing downlink service packet and uplink service packet may include service data of the base station, a protocol packet between the base station and the base station gateway, and the like.

In this embodiment of the present invention, a mapping relationship is dynamically established between an IP address of a base station and an ID of a transport tunnel according to an uplink packet of the base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

In addition, in this embodiment of the present invention, IP address planning and configuration are not required, thereby avoiding a workload of IP address planning.

Figure 2:
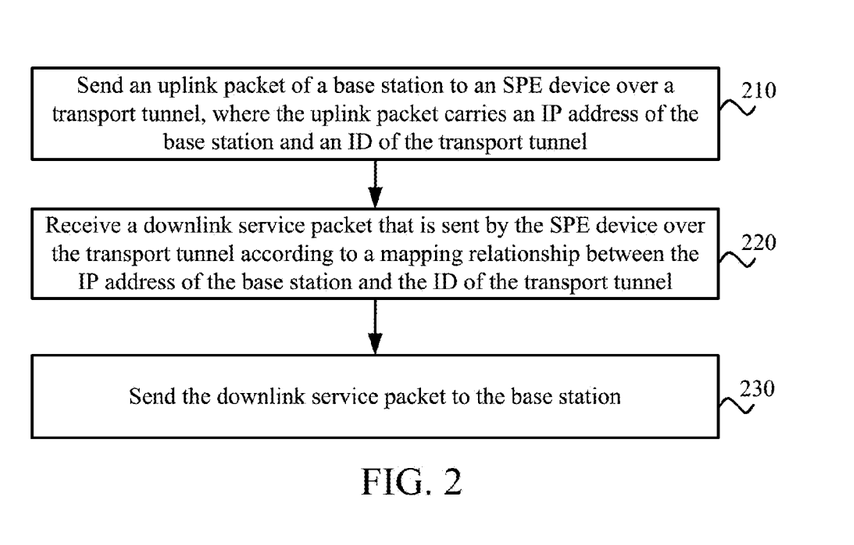
FIG. 2 is a schematic flowchart of a service forwarding method according to an embodiment of the present invention.

FIG. 2 is a schematic flowchart of a service forwarding method according to an embodiment of the present invention. The method in FIG. 2 is executed by a UPE device.

210. Send an uplink packet of a base station to an SPE device over a transport tunnel. The uplink packet carries an IP address of the base station and an ID of the transport tunnel.

Optionally, in an embodiment, the UPE device may send an uplink ARP packet of the base station to the SPE device over the transport tunnel. The uplink ARP packet may carry an interface IP address of the base station and the ID of the transport tunnel.

Optionally, in another embodiment, the UPE device may send an uplink LLDP packet of the base station to the SPE device over the transport tunnel. The uplink LLDP packet may carry an interface IP address of the base station, a service logic IP address of the base station, and the ID of the transport tunnel.

Optionally, in another embodiment, before step 210, a transport tunnel may be established between the UPE device and the SPE device. The transport tunnel corresponds to a port that is on the UPE device and used for communication with the base station.

There may be one or more ports on the UPE device, and these ports are used for communication with the base station. Each port is corresponding to one base station. One transport tunnel may be established between the SPE device and the UPE device based on each port. In this way, it may be ensured that each base station is corresponding to a separate transport tunnel. Therefore, an Ethernet line connection may still be maintained between the SPE device and the UPE device.

Optionally, in another embodiment, the ID of the transport tunnel may include a packet label or a physical pipe identifier.

For example, the transport tunnel may be identified by an identifier of a VLAN (for example, an SVLAN), a port, a PBB, a PW, an ODU, or the like.

220. Receive a downlink service packet that is sent by the SPE device over the transport tunnel according to a mapping relationship between the IP address of the base station and the ID of the transport tunnel. A destination IP address of the downlink service packet is the IP address of the base station.

230. Send the downlink service packet to the base station.

Optionally, in another embodiment, the UPE device may further receive an uplink service packet from the base station, and send the uplink service packet to the SPE device over the transport tunnel.

In this embodiment of the present invention, an uplink packet that carries an IP address of the base station and an ID of a transport tunnel is sent to an SPE device, and a downlink service packet is received. The downlink service packet is sent by the SPE device over the transport tunnel according to a mapping relationship between the IP address of the base station and the ID of the transport tunnel. In this way, a service packet can be sent independent of a VLAN, and a coupling between a transport VLAN and a wireless VLAN can be removed, thereby reducing a workload of coordination between different devices and facilitating network adjustment.

The following describes the embodiments of the present invention in detail with reference to specific examples. It should be understood that these examples aim to help those skilled in the art better understand the embodiments of the present invention, and they under no circumstances intend to limit the scope of the embodiments of the present invention.

Figure 3:
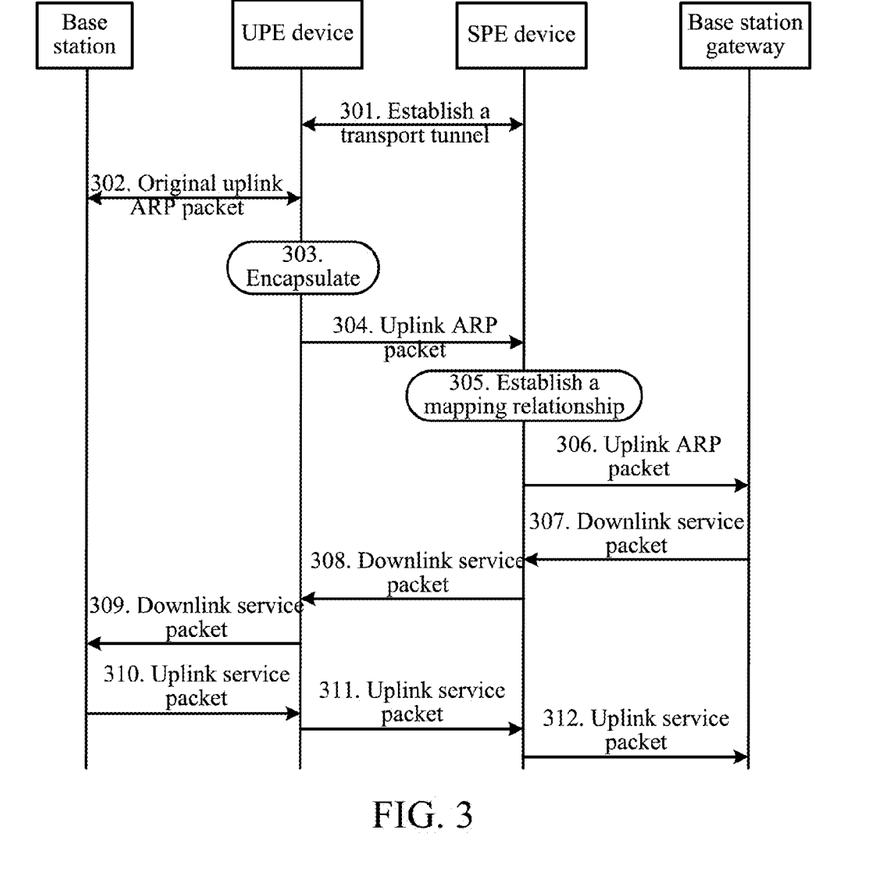
FIG. 3 is a schematic flowchart of a process of a service forwarding method according to an embodiment of the present invention.

FIG. 3 is a schematic flowchart of a process of a service forwarding method according to an embodiment of the present invention.

301. Establish a transport tunnel between an SPE device and a UPE device.

The transport tunnel is corresponding to a port that is on the UPE device and used for communication with a base station.

302. The base station sends an original uplink ARP packet to the UPE device. The original uplink ARP packet carries an interface IP address of the base station.

Step 302 may be performed before normal service transmission or during a normal service transmission process.

303. The UPE device encapsulates an ID of the transport tunnel into the received original uplink ARP packet to obtain an uplink ARP packet. The uplink ARP packet carries the interface IP address of the base station and the ID of the transport tunnel.

304. The UPE device sends the uplink ARP packet to the SPE device over the transport tunnel.

305. The SPE device establishes a mapping relationship between the interface IP address of the base station and the ID of the transport tunnel according to the uplink ARP packet.

306. The SPE device sends the uplink ARP packet to a base station gateway.

The SPE may determine a corresponding aggregation port by using an internal VSF corresponding to the base station and may send the uplink ARP packet to the base station gateway through the aggregation port.

307. The base station gateway sends a downlink service packet that needs to be sent to the base station to the SPE device.

308. The SPE device sends a downlink service packet whose destination IP address is the base station IP interface address to the UPE device over the transport tunnel according to the mapping relationship.

309. The UPE device sends the downlink service packet to the base station by using a private line connection.

Steps 310 to 312 are a transmission process of an uplink service packet.

310. The base station sends an uplink service packet to the UPE device by using a private line connection.

311. The UPE device sends the uplink service packet to the SPE device over the transport tunnel.

312. The SPE device sends the uplink service packet to the base station gateway.

The SPE device may forward the uplink service packet to an aggregation port corresponding to the VSF by using the internal VSF corresponding to the base station, and send the uplink service packet to the base station gateway through the aggregation port.

It should be noted that the SPE may, before the mapping relationship is established, broadcast the downlink service packet through all transport tunnels associated with the VSF.

It should be understood that sequence numbers of the foregoing processes do not represent an order of implementation; and the implementation order of each process depends on its function and internal logic, which does not constitute any limitation on the implementation process of this embodiment of the present invention. For example, steps 307 to 309 may be performed at the same time as steps 310 to 312, or may be performed after steps 310 to 312.

In this embodiment of the present invention, a mapping relationship is established between an IP address of the base station and an ID of a transport tunnel according to an uplink ARP packet of a base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

Figure 4:
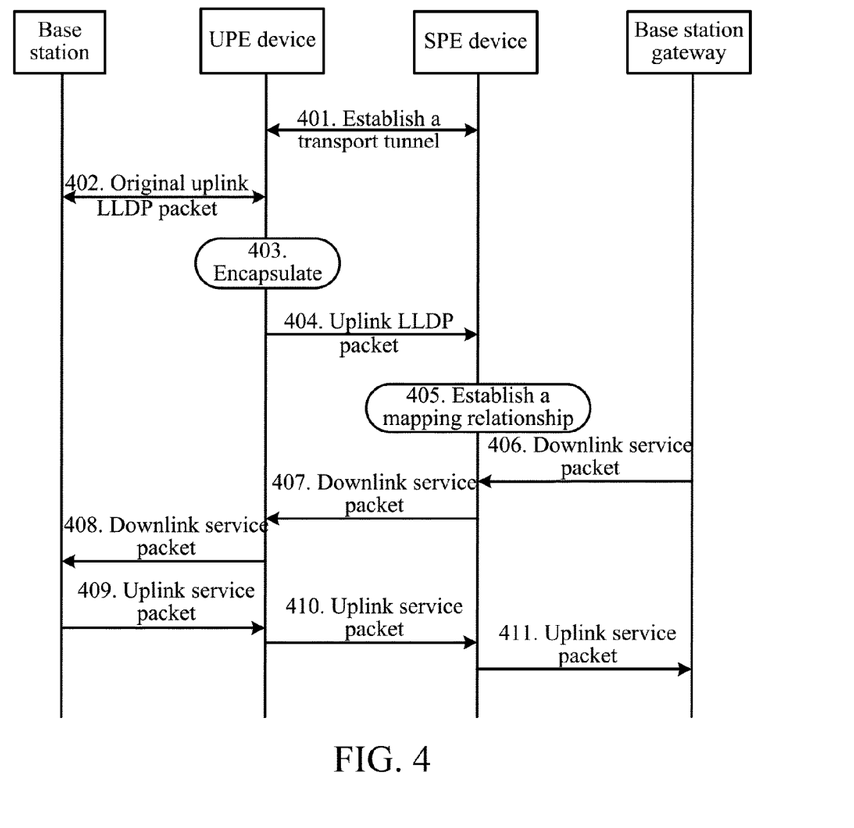
FIG. 4 is a schematic flowchart of a process of a service forwarding method according to another embodiment of the present invention.

FIG. 4 is a schematic flowchart of a process of a service forwarding method according to another embodiment of the present invention.

401. Establish a transport tunnel between an SPE device and a UPE device.

The transport tunnel is corresponding to a port that is on the UPE device and used for communication with a base station.

402. The base station sends an original uplink LLDP packet to the UPE device. The original uplink LLDP packet carries an interface IP address of the base station and a service logic IP address of the base station.

403. The UPE device encapsulates an ID of the transport tunnel into the original uplink LLDP packet to obtain an uplink LLDP packet. The uplink LLDP packet carries the interface IP address of the base station, the service logic IP address of the base station, and the ID of the transport tunnel.

Figure 5:
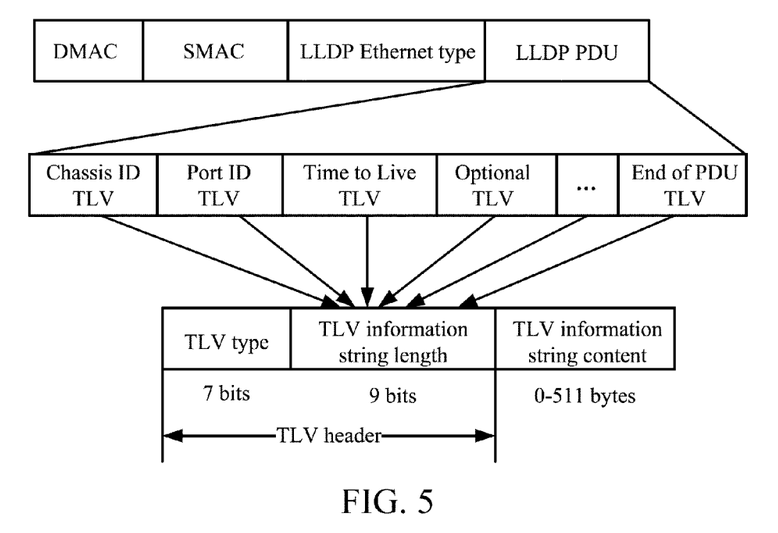
FIG. 5 is a schematic diagram of an example of a format of an uplink LLDP packet according to an embodiment of the present invention.

FIG. 5 is a schematic diagram of an example of a format of an uplink LLDP packet according to an embodiment of the present invention. As shown in FIG. 5, the uplink LLDP packet may include a destination media access control (Destination Media Access Control, DMAC) address, a source MAC (Source MAC, SMAC) address, an LLDP Ethernet type, and an LLDP protocol data unit (Protocol Data Unit, PDU).

The LLDP PDU field may include a Chassis (Chassis) ID TLV, a Port (Port) ID TLV, a Time to Live (Time to Live) TLV, an Optional (Optional) TLV, an End of PDU (End of PDU) TLV, and the like field. The Optional TLV may include an interface IP address of the base station and a service logic IP address of the base station. In addition, as shown in FIG. 5, the format of a TLV may include a TLV header (Header) and TLV information string content. The TLV header may include a TLV type (Type) and a TLV information string length (Length).

404. The UPE device sends the uplink LLDP packet to the SPE device over the transport tunnel.

405. The SPE device may establish a mapping relationship among the interface IP address of the base station, the service logic IP address of the base station, and the ID of the transport tunnel according to the uplink LLDP packet.

It should be noted that the LLDP packet does not need to be forwarded to the base station gateway, and the SPE device may discard the uplink LLDP packet after the mapping relationship is established.

Steps 406 to 411 are similar to steps 307 to 312 in FIG. 3. To avoid repetition, details are not described herein again.

It should be understood that sequence numbers of the foregoing processes do not represent an order of implementation; and the implementation order of each process depends on its function and internal logic, which does not constitute any limitation on the implementation process of this embodiment of the present invention.

In this embodiment of the present invention, a mapping relationship is established between an IP address of the base station and an ID of a transport tunnel according to an uplink LLDP packet of a base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

Figure 6:
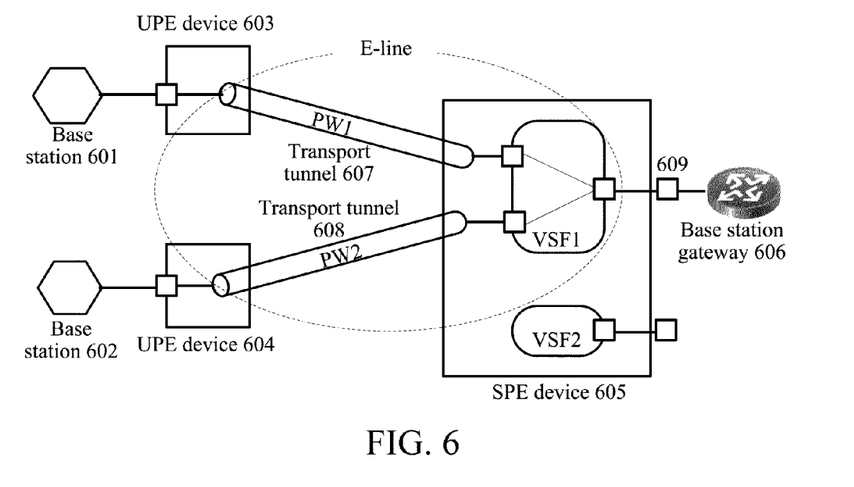
FIG. 6 is a schematic diagram of an example of a scenario to which an embodiment of the present invention is applicable.

FIG. 6 is a schematic diagram of an example of a scenario to which an embodiment of the present invention is applicable.

In the scenario in FIG. 6, it is assumed that there are two base stations: a base station 601 and a base station 602. The base station 601 is connected to a UPE device 603, and the base station 602 is connected to a UPE device 604.

A transport tunnel 607 is established between the UPE device 603 and an SPE device 605, and the transport tunnel 607 is corresponding to the base station 601. A transport tunnel 608 is established between the UPE device 604 and the SPE device 605, and the transport tunnel 608 is corresponding to the base station 602. It can be learned that an Ethernet line connection may still be maintained between a UPE device and an SPE device.

In FIG. 6, that the transport tunnel 607 and transport tunnel 608 are classified according to a PW is used as an example for description. It is assumed that an ID of the transport tunnel 607 is PW1 and an ID of the transport tunnel 608 is PW2. In addition, it is assumed that an interface IP address of the base station 601 is IP11 and an interface IP address of the base station 602 is IP12.

The base station 601 may send an original uplink ARP packet to the UPE device 603. The UPE device 603 may encapsulate the ID of the transport tunnel 607 into the original uplink ARP packet to obtain an uplink ARP packet, and send the uplink ARP packet to the SPE device 605 over the transport tunnel 607. The uplink ARP packet may carry the interface IP address of the base station 601 (that is, IP11) and the ID of the transport tunnel 607 (that is, PW1).

The SPE device 605 may establish a mapping relationship between the interface IP address of the base station 601 and the ID of the transport tunnel 607 according to the uplink ARP packet, that is, IP11-PW1.

In FIG. 6, two VSFs may be planned inside the SPE device 605: a VSF1 and a VSF2. The base station 601 and the base station 602 are corresponding to the VSF1, and the VSF1 automatically connects the transport tunnel 607 to an aggregation port of the SPE device 605. The SPE device 605 may send an uplink ARP packet of the base station 601 to a base station gateway 606 through the aggregation port 609.

In addition, the base station 601 may further send an original uplink LLDP packet to the UPE device 603. The UPE device 603 may encapsulate the ID of the transport tunnel 607 into the original uplink LLDP packet to obtain an uplink LLDP packet. The uplink LLDP packet may carry the interface IP address of the base station 601, a service logic IP address of the base station 601, and the ID of the transport tunnel 607.

The SPE device 605 may establish a mapping relationship among the interface IP address of the base station 601, the service logic IP address of the base station 601, and the ID of the transport tunnel 607 according to the uplink LLDP packet, that is, IP11—the service logic IP address of the base station 601—PW1.

For the base station 602, the SPE device 605 may also establish a mapping relationship between the interface IP address IP12 of the base station 602 and the ID of the transport tunnel 608 according to the uplink ARP packet of the base station 602, that is, IP12—PW2. Alternatively, the SPE device 605 may further establish a mapping relationship among the interface IP address of the base station 602, a service logic IP address of the base station 602, and the ID of the transport tunnel 608 according to the uplink LLDP packet of the base station 602, that is, IP12—the service logic IP address of the base station 602—PW2. Other processes are similar to the processes of the base station 601. To avoid repetition, details are not described herein again.

In a downlink direction, the SPE device 605 may obtain a downlink service packet that is required to be transmitted to the base station 601 and base station 602 from the base station gateway 606. The SPE device 605 may send a downlink packet whose destination IP address is IP11 to the UPE device 603 over the transport tunnel 607 according to the mapping relationship specific to the base station 601. The SPE device 605 may further send a downlink packet whose destination IP address is IP12 to the UPE device 604 over the transport tunnel 608 according to the mapping relationship specific to the base station 602.

In an uplink direction, the base station 601 may send an uplink service packet to the UPE device 603, and the UPE device 603 may send the uplink service packet to the SPE device 605 over the transport tunnel 607. Inside the SPE device 605, the VSF1 may forward the uplink service packet to the aggregation port 609, and the uplink service packet is sent to the base station gateway 606 through the aggregation port 609.

A transmission process of the uplink service packet of the base station 602 is similar to that of the base station 601. To avoid repetition, details are not described herein again.

In this embodiment of the present invention, a mapping relationship is dynamically established between an IP address of the base station and an ID of a transport tunnel according to an uplink packet of a base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

Figure 7:
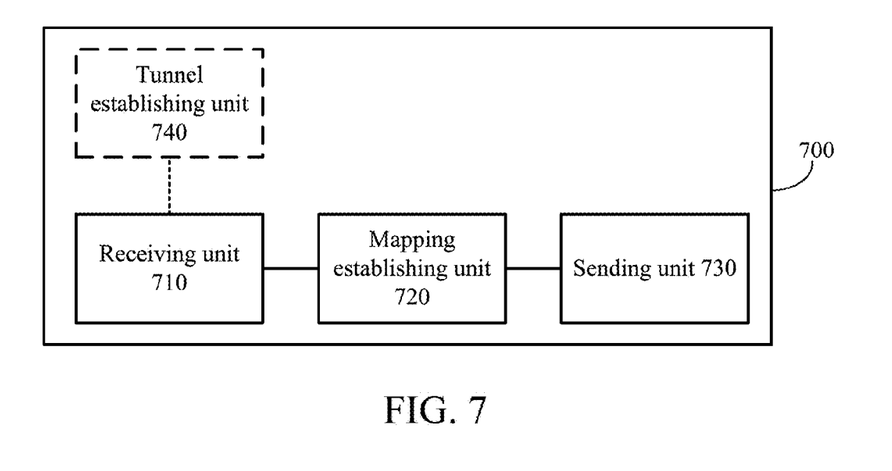
FIG. 7 is a schematic block diagram of an SPE device according to an embodiment of the present invention.

FIG. 7 is a schematic block diagram of an SPE device according to an embodiment of the present invention. The SPE device 700 includes a receiving unit 710, a mapping establishing unit 720, and a sending unit 730.

The receiving unit 710 receives an uplink packet of a base station that is sent by a UPE device over a transport tunnel. The uplink packet carries an Internet Protocol (IP) address of the base station and an identifier of the transport tunnel. The mapping establishing unit 720 establishes a mapping relationship between the IP address of the base station and the identifier of the transport tunnel according to the uplink packet. The sending unit 730 sends a downlink service packet to the UPE device over the transport tunnel according to the mapping relationship. A destination IP address of the downlink service packet is the IP address of the base station.

In this embodiment of the present invention, a mapping relationship is dynamically established between an IP address of the base station and an ID of a transport tunnel according to an uplink packet of a base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

For other functions and operations of the SPE device 700, refer to processes related to the SPE device described in the foregoing method embodiments shown in FIG. 1 to FIG. 6. To avoid repetition, details are not described herein again.

Optionally, in an embodiment, the receiving unit 710 may receive an uplink Address Resolution Protocol ARP packet of the base station that is sent by the UPE device over the transport tunnel. The uplink ARP packet carries an interface IP address of the base station and the identifier of the transport tunnel. The mapping establishing unit 720 may establish a mapping relationship between the interface IP address of the base station and the identifier of the transport tunnel according to the uplink ARP packet.

Optionally, in another embodiment, the receiving unit 710 may receive an uplink Link Layer Discovery Protocol LLDP packet of the base station that is sent by the UPE device over the transport tunnel. The uplink LLDP packet carries an interface IP address of the base station, a service logic IP address of the base station, and the identifier of the transport tunnel. The mapping establishing unit 720 may establish a mapping relationship among the interface IP address of the base station, the service logic IP address of the base station, and the identifier of the transport tunnel according to the uplink LLDP packet.

Optionally, in another embodiment, the SPE device 700 may further include a tunnel establishing unit 740. The tunnel establishing unit 740 may establish a transport tunnel with the UPE device. The transport tunnel is corresponding to a port that is on the UPE device and used for communication with the base station.

Optionally, in another embodiment, the identifier of the transport tunnel may include a packet label or a physical pipe identifier.

Optionally, in another embodiment, the receiving unit 710 may further receive an uplink service packet of the base station that is sent by the UPE device over the transport tunnel. The sending unit 730 may send the uplink service packet to a base station gateway through an aggregation port corresponding to the transport tunnel.

Figure 8:
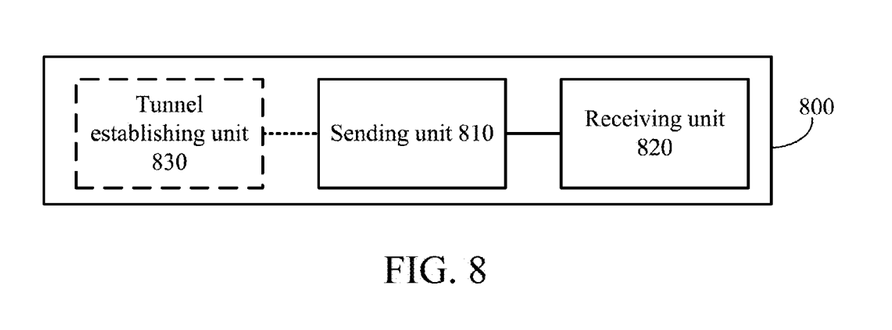
FIG. 8 is a schematic block diagram of a UPE device according to an embodiment of the present invention.

FIG. 8 is a schematic block diagram of a UPE device according to an embodiment of the present invention. The UPE device 800 includes a sending unit 810 and a receiving unit 820.

The sending unit 810 sends an uplink packet of a base station to an SPE device over a transport tunnel. The uplink packet carries an Internet Protocol IP address of the base station and an identifier of the transport tunnel. The receiving unit 820 receives a downlink service packet that is sent by the SPE device over the transport tunnel according to a mapping relationship between the IP address of the base station and the identifier of the transport tunnel. A destination IP address of the downlink service packet is the IP address of the base station. The sending unit 810 further sends the downlink service packet to the base station.

In this embodiment of the present invention, an uplink packet that carries an IP address of the base station and an ID of a transport tunnel is sent to an SPE device, and a downlink service packet is received. The downlink service packet is sent by the SPE device over the transport tunnel according to a mapping relationship between the IP address of the base station and the ID of the transport tunnel. In this way, a service packet can be sent independent of a VLAN, and a coupling between a transport VLAN and a wireless VLAN can be removed, thereby reducing a workload of coordination between different devices and facilitating network adjustment.

For other functions and operations of the UPE device 800, refer to processes related to the UPE device described in the foregoing method embodiments shown in FIG. 1 to FIG. 6. To avoid repetition, details are not described herein again.

Optionally, in an embodiment, the sending unit 810 may send an uplink Address Resolution Protocol ARP packet of the base station to the SPE device over the transport tunnel. The uplink ARP packet carries an interface IP address of the base station and the identifier of the transport tunnel.

Optionally, in another embodiment, the sending unit 810 may send an uplink Link Layer Discovery Protocol LLDP packet of the base station to the SPE device over the transport tunnel. The uplink LLDP packet carries an interface IP address of the base station, a service logic IP address of the base station, and the identifier of the transport tunnel.

Optionally, in an embodiment, the UPE device 800 may further include a tunnel establishing unit 830.

The tunnel establishing unit 830 may establish a transport tunnel with the SPE device. The transport tunnel corresponds to a port that is on the UPE device 800 and used for communication with the base station.

Optionally, in an embodiment, the identifier of the transport tunnel may include a packet label or a physical pipe identifier.

Optionally, in an embodiment, the receiving unit 820 may further receive an uplink service packet from the base station. The sending unit 810 may further send the uplink service packet to the SPE device over the transport tunnel.

Figure 9:
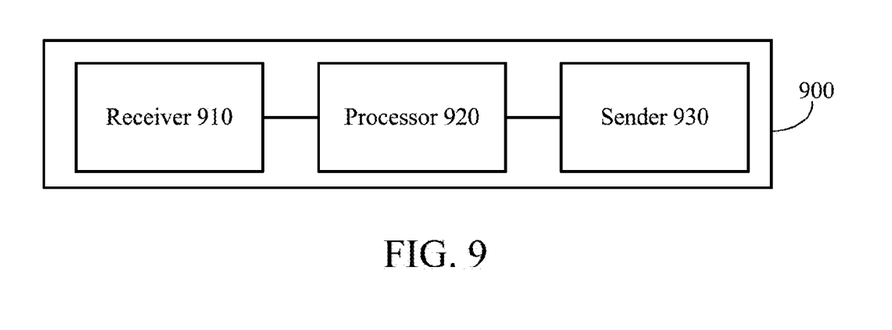
FIG. 9 is a schematic block diagram of an SPE device according to an embodiment of the present invention.

FIG. 9 is a schematic block diagram of an SPE device according to an embodiment of the present invention. An SPE device 900 includes a receiver 910, a processor 920, and a sender 930.

The receiver 910 receives an uplink packet of a base station that is sent by a UPE device over a transport tunnel. The uplink packet carries an Internet Protocol (IP) address of the base station and an identifier of the transport tunnel. The processor 920 establishes a mapping relationship between the IP address of the base station and the identifier of the transport tunnel according to the uplink packet. The sender 930 sends a downlink service packet to the UPE device over the transport tunnel according to the mapping relationship. A destination IP address of the downlink service packet is the IP address of the base station.

In this embodiment of the present invention, a mapping relationship is dynamically established between an IP address of the base station and an ID of a transport tunnel according to an uplink packet of a base station, and a downlink service packet is sent to a UPE device according to the mapping relationship. In this way, a service packet can be sent independent of a VLAN, and a coupling between a transport VLAN and a wireless VLAN can be removed, thereby reducing a workload of coordination between different devices and facilitating network adjustment.

For other functions and operations of the SPE device 900, refer to processes related to the SPE device described in the foregoing method embodiments shown in FIG. 1 to FIG. 6. To avoid repetition, details are not described herein again.

Optionally, in an embodiment, the receiver 910 may receive an uplink Address Resolution Protocol ARP packet of the base station that is sent by the UPE device over the transport tunnel. The uplink ARP packet carries an interface IP address of the base station and the identifier of the transport tunnel. The processor 920 may establish a mapping relationship between the interface IP address of the base station and the identifier of the transport tunnel according to the uplink ARP packet.

Optionally, in another embodiment, the receiver 910 may receive an uplink Link Layer Discovery Protocol LLDP packet of the base station that is sent by the UPE device over the transport tunnel. The uplink LLDP packet carries an interface IP address of the base station, a service logic IP address of the base station, and the identifier of the transport tunnel. The processor 920 may establish a mapping relationship among the interface IP address of the base station, the service logic IP address of the base station, and the identifier of the transport tunnel according to the uplink LLDP packet.

Optionally, in another embodiment, the processor 920 may further establish a transport tunnel with the UPE device. The transport tunnel corresponds to a port that is on the UPE device and used for communication with the base station.

Optionally, in another embodiment, the identifier of the transport tunnel may include a packet label or a physical pipe identifier.

Optionally, in another embodiment, the receiver 910 may further receive an uplink service packet of the base station that is sent by the UPE device over the transport tunnel. The sender 930 may send the uplink service packet to a base station gateway through an aggregation port corresponding to the transport tunnel.

Figure 10:
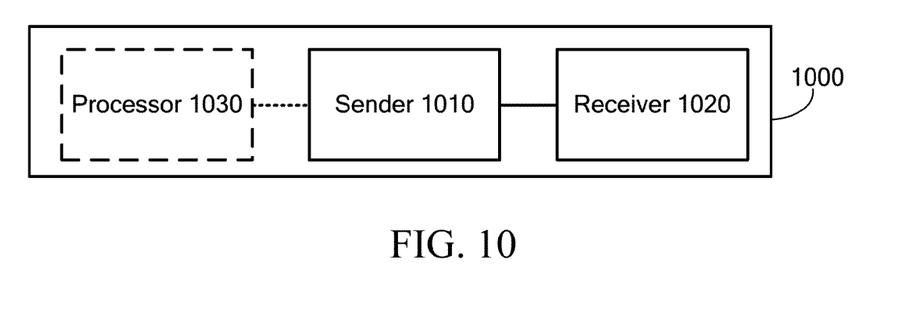
FIG. 10 is a schematic block diagram of a UPE device according to an embodiment of the present invention.

FIG. 10 is a schematic block diagram of a UPE device according to an embodiment of the present invention. The UPE device 1000 includes a sender 1010 and a receiver 1020.

The sender 1010 sends an uplink packet of a base station to an SPE device over a transport tunnel. The uplink packet carries an Internet Protocol (IP) address of the base station and an identifier of the transport tunnel. The receiver 1020 receives a downlink service packet that is sent by the SPE device over the transport tunnel according to a mapping relationship between the IP address of the base station and the identifier of the transport tunnel. A destination IP address of the downlink service packet is the IP address of the base station. The sender 1010 further sends the downlink service packet to the base station.

In this embodiment of the present invention, an uplink packet that carries an IP address of the base station and an ID of a transport tunnel is sent to an SPE device, and a downlink service packet is received. The downlink service packet is sent by the SPE device over the transport tunnel according to a mapping relationship between the IP address of the base station and the ID of the transport tunnel. In this way, a service packet can be sent independent of a VLAN, and a coupling between a transport VLAN and a wireless VLAN can be removed, thereby reducing a workload of coordination between different devices and facilitating network adjustment.

For other functions and operations of the UPE device 1000, refer to processes related to the UPE device described in the foregoing method embodiments shown in FIG. 1 to FIG. 6. To avoid repetition, details are not described herein again.

Optionally, in an embodiment, the sender 1010 may send an uplink Address Resolution Protocol ARP packet of the base station to the SPE device over the transport tunnel. The uplink ARP packet carries an interface IP address of the base station and the identifier of the transport tunnel.

Optionally, in another embodiment, the sender 1010 may send an uplink Link Layer Discovery Protocol LLDP packet of the base station to the SPE device over the transport tunnel. The uplink LLDP packet carries an interface IP address of the base station, a service logic IP address of the base station, and the identifier of the transport tunnel.

Optionally, in an embodiment, the UPE device 800 may further include a processor 1030. The processor 1030 may establish a transport tunnel with the SPE device. The transport tunnel corresponds to a port that is on the UPE device 800 and used for communication with the base station.

Optionally, in an embodiment, the identifier of the transport tunnel may include a packet label or a physical pipe identifier.

Optionally, in an embodiment, the receiver 1020 may further receive an uplink service packet from the base station. The sender 1010 may further send the uplink service packet to the SPE device over the transport tunnel.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service forwarding method comprising:
receiving an uplink packet of a base station that is sent by a user-end provider edge (UPE) device over a transport tunnel, wherein the transport tunnel is between the UPE device and an edge device, wherein the uplink packet carries an Internet Protocol (IP) address of the base station and an identifier of the transport tunnel, wherein the receiving the uplink packet comprises receiving an uplink protocol packet of the base station that is sent by the UPE device over the transport tunnel, wherein the uplink protocol packet carries an interface IP address of the base station and the identifier of the transport tunnel;
establishing a mapping relationship between the IP address of the base station and the identifier of the transport tunnel according to the uplink packet, wherein the establishing of the mapping relationship comprises establishing a mapping relationship between the interface IP address of the base station and the identifier of the transport tunnel according to the uplink protocol packet; and
sending a downlink service packet to the UPE device over the transport tunnel according to the mapping relationship, wherein a destination IP address of the downlink service packet is the IP address of the base station.

2. The method according to claim 1, wherein the uplink protocol packet is an uplink Address Resolution Protocol (ARP) packet of the base station that is sent by the UPE device over the transport tunnel.

3. The method according to claim 1, wherein the uplink protocol packet of the base station is an uplink Link Layer Discovery Protocol (LLDP) packet of the base station that is sent by the UPE device over the transport tunnel, wherein the uplink protocol packet further carries a service logic IP address of the base station; and
wherein the establishing of the mapping relationship between the IP address of the base station and the identifier of the transport tunnel comprises establishing a mapping relationship among the interface IP address of the base station, the service logic IP address of the base station, and the identifier of the transport tunnel according to the uplink LLDP packet.

4. The method according to claim 1, further comprising:
establishing the transport tunnel between a superstratum provider edge (SPE) device and the UPE device, wherein the transport tunnel is corresponding to a port that is on the UPE device and used for communication with the base station, wherein the edge device is the SPE device.

5. The method according to claim 1, wherein the identifier of the transport tunnel comprises a packet label or a physical pipe identifier.

6. The method according to claim 1, further comprising:
receiving an uplink service packet of the base station that is sent by the UPE device over the transport tunnel; and
sending the uplink service packet to a base station gateway through an aggregation port corresponding to the transport tunnel.

7. A service forwarding method comprising:
sending an uplink packet of a base station to a superstratum provider edge (SPE) device over a transport tunnel, wherein the transport tunnel is between the SPE device and an edge device, wherein the uplink packet carries an Internet Protocol (IP) address of the base station and an identifier of the transport tunnel, wherein the uplink packet is an uplink protocol packet, wherein the uplink protocol packet carries an interface IP address of the base station and the identifier of the transport tunnel, wherein the uplink protocol packet is an uplink Address Resolution Protocol (ARP) packet of the base station to the SPE device over the transport tunnel; OR
wherein the uplink protocol packet is an uplink Link Layer Discovery Protocol (LLDP) packet of the base station to the SPE device over the transport tunnel, and wherein the uplink protocol packet further carries a service logic IP address of the base station;
receiving a downlink service packet that is sent by the SPE device over the transport tunnel according to a mapping relationship between the IP address of the base station and the identifier of the transport tunnel, wherein a destination IP address of the downlink service packet is the IP address of the base station; and
sending the downlink service packet to the base station.

8. The method according to claim 7, wherein the uplink protocol packet is
an uplink Address Resolution Protocol (ARP) packet of the base station to the SPE device over the transport tunnel.

9. The method according to claim 7, wherein the uplink protocol packet is
an uplink Link Layer Discovery Protocol (LLDP) packet of the base station to the SPE device over the transport tunnel, wherein the uplink protocol packet further carries a service logic IP address of the base station.

10. The method according to claim 7, further comprising:
establishing the transport tunnel between a user-end provider edge (UPE) device and the SPE device, wherein the transport tunnel is corresponding to a port that is on the UPE device and used for communication with the base station, wherein the edge device is the UPE device.

11. The method according to claim 7, wherein the identifier of the transport tunnel comprises a packet label or a physical pipe identifier.

12. The method according to claim 7, further comprising:
receiving an uplink service packet from the base station; and
sending the uplink service packet to the SPE device over the transport tunnel.

13. A superstratum provider edge (SPE) device comprising:
a processor;
a memory storing a program configured to be executed in the processor;
a receiver configured to receive an uplink packet of a base station that is sent by a user-end provider edge (UPE) device over a transport tunnel, wherein the transport tunnel is between the UPE device and an edge device, wherein the uplink packet carries an Internet Protocol (IP) address of the base station and an identifier of the transport tunnel, wherein the receiver is configured to receive an uplink protocol packet of the base station that is sent by the UPE device over the transport tunnel, wherein the uplink protocol packet carries an interface IP address of the base station and the identifier of the transport tunnel;
wherein the program comprises a mapping establishing unit configured to establish a mapping relationship between the IP address of the base station and the identifier of the transport tunnel according to the uplink packet, wherein the mapping establishing unit comprises instructions to establish a mapping relationship between the interface IP address of the base station and the identifier of the transport tunnel according to the uplink protocol packet; and
a transmitter configured to send a downlink service packet to the UPE device over the transport tunnel according to the mapping relationship, wherein a destination IP address of the downlink service packet is the IP address of the base station.

14. The SPE device according to claim 13, wherein the uplink protocol packet is an uplink-Address Resolution Protocol (ARP) packet of the base station that is sent by the UPE device over the transport tunnel.

15. The SPE device according to claim 13, wherein the uplink protocol packet is an uplink Link Layer Discovery Protocol (LLDP) packet of the base station that is sent by the UPE device over the transport tunnel, wherein the uplink LLDP packet carries an interface IP address of the base station, a service logic IP address of the base station, and the identifier of the transport tunnel; and
wherein the mapping establishing unit is comprises instructions to establish a mapping relationship among the interface IP address of the base station, the service logic IP address of the base station, and the identifier of the transport tunnel according to the uplink LLDP packet.

16. The SPE device according to claim 13,
wherein the program comprises a tunnel establishing unit configured to establish the transport tunnel with the UPE device, wherein the transport tunnel is corresponding to a port that is on the UPE device and used for communication with the base station.

17. The SPE device according to claim 13, wherein the identifier of the transport tunnel comprises a packet label or a physical pipe identifier.

18. The SPE device according to claim 13, wherein the receiver is further configured to receive an uplink service packet of the base station that is sent by the UPE device over the transport tunnel; and the transmitter is further configured to send the uplink service packet to a base station gateway through an aggregation port corresponding to the transport tunnel.

* * * * *